(12) United States Patent
Faur-Ghenciu et al.

(10) Patent No.: US 7,824,455 B2
(45) Date of Patent: *Nov. 2, 2010

(54) HIGH ACTIVITY WATER GAS SHIFT CATALYSTS BASED ON PLATINUM GROUP METALS AND CERIUM-CONTAINING OXIDES

(75) Inventors: Anca Faur-Ghenciu, King of Prussia, PA (US); Nathan Edward Trusty, Philadelphia, PA (US); Mark Robert Feaviour, Reading (GB); Jessica Grace Reinkingh, Malvern, PA (US); Phillip Shady, Newtown, PA (US); Paul Joseph Andersen, Plymouth Meeting, PA (US)

(73) Assignee: General Motors Corporation, Detroit, MI (US)

( * ) Notice: Subject to any disclaimer, the term of this patent is extended or adjusted under 35 U.S.C. 154(b) by 1084 days.

This patent is subject to a terminal disclaimer.

(21) Appl. No.: 10/617,146

(22) Filed: Jul. 10, 2003

(65) Prior Publication Data

US 2005/0005520 A1      Jan. 13, 2005

(51) Int. Cl.
*C01B 3/24* (2006.01)
*C10J 3/46* (2006.01)

(52) U.S. Cl. .................... 48/198.3; 48/127.5; 48/127.8; 48/128; 48/197 R; 48/198.7; 48/214 R; 48/214 A; 48/61; 423/247; 423/656; 423/437.2; 423/655; 423/246; 429/17; 429/19; 422/177; 422/190; 422/196; 252/373; 252/376; 502/439

(58) Field of Classification Search ................ 48/198.7; 423/655, 656; 422/211; 502/240
See application file for complete search history.

(56) References Cited

U.S. PATENT DOCUMENTS 5,458,857 A   10/1995   Collins et al.
5,464,606 A   11/1995   Buswell et al.
5,648,545 A    7/1997   Reif et al.
5,916,702 A    6/1999   Marucchi-Soos et al.

(Continued)

FOREIGN PATENT DOCUMENTS

| EP | 0320243 | 6/1989 |
| JP | 06254414 A | 9/1994 |
| JP | 07039755 A | 2/1995 |
| WO | 02/090247 | 11/2002 |
| WO | WO2004083116 A1 | 9/2004 |

OTHER PUBLICATIONS

Great Britain Search Report dated Jan. 12, 2005 for corresponding Great Britain application GB0415342.5.

*Primary Examiner*—Alexa D. Neckel
*Assistant Examiner*—Kaity V. Handal
(74) *Attorney, Agent, or Firm*—Dinsmore & Shohl LLP

(57) ABSTRACT

A method of reducing the amount of carbon monoxide in process fuel gas in a feed stream for a fuel cell. The method includes introducing a hydrocarbon feed stream into a primary reactor and reacting the hydrocarbon feed stream in effective contact with a reforming catalyst forming primary reactor products containing hydrogen, carbon monoxide, carbon dioxide, and methane; placing a high activity water gas shift catalyst system into a water gas shift converter, introducing the primary reactor products into the water gas shift converter in effective contact with the high activity water gas shift catalyst system, and reacting the carbon monoxide and water to form carbon dioxide and hydrogen using a water gas shift reaction forming the feed stream for the fuel cell; and introducing the feed stream into the fuel cell. The high water gas shift catalyst system includes a noble metal, a support comprising a mixed metal oxide of cerium oxide and at least one of zirconium oxide or lanthanum oxide. A promoter of yttrium, an alkali metal, or alkaline earth metal can be included. A support dopant can also be included.

50 Claims, 8 Drawing Sheets

U.S. PATENT DOCUMENTS

| | | |
|---|---|---|
| 6,040,265 A * | 3/2000 | Nunan ................ 502/242 |
| 6,090,312 A | 7/2000 | Ziaka et al. |
| 6,162,267 A | 12/2000 | Priegnitz et al. |
| 6,190,623 B1 | 2/2001 | Sanger et al. |
| 6,244,367 B1 | 6/2001 | Ahmed et al. |
| 6,280,864 B1 | 8/2001 | Towler et al. |
| 6,299,995 B1 | 10/2001 | Abdo et al. |
| 6,342,197 B1 | 1/2002 | Senetar et al. |
| 6,375,924 B1 | 4/2002 | Towler et al. |
| 6,409,939 B1 | 6/2002 | Abdo et al. |
| 6,409,974 B1 | 6/2002 | Towler et al. |
| 6,413,479 B1 | 7/2002 | Kudo et al. |
| 6,436,354 B1 | 8/2002 | Priegnitz et al. |
| 6,455,182 B1 | 9/2002 | Silver |
| 6,756,339 B1 | 6/2004 | Rokicki et al. |
| 6,932,848 B2 * | 8/2005 | Dardas et al. ............ 48/127.7 |
| 7,144,566 B2 | 12/2006 | Anzai et al. |
| 2002/0122764 A1 | 9/2002 | Shore et al. |
| 2002/0131915 A1 | 9/2002 | Shore et al. |
| 2002/0147103 A1 | 10/2002 | Ruettinger et al. |
| 2003/0007912 A1 | 1/2003 | Silver ................. 422/190 |
| 2003/0186804 A1 * | 10/2003 | Wagner et al. ............ 502/300 |
| 2003/0235526 A1 | 12/2003 | Vanderspurt et al. ........ 423/263 |

* cited by examiner

HIGH ACTIVITY WATER GAS SHIFT CATALYSTS BASED ON PLATINUM GROUP METALS AND CERIUM-CONTAINING OXIDES

BACKGROUND OF THE INVENTION

The present invention relates generally to a process for generating hydrogen, and more particularly to a process for reducing the amount of carbon monoxide in process fuel gas in a water gas shift converter, and to high activity water gas shift catalyst systems for use in such a process.

In a fuel cell, electrical power is generated by a chemical reaction. The most common fuel cells involve the chemical reaction between a reducing agent, such as hydrogen, and an oxidizing agent, such as oxygen. In order to be used in such a fuel cell, hydrocarbon fuel must first be converted into a hydrogen-rich stream.

Fuel processing systems to convert hydrocarbon fuel into a hydrogen-rich stream generally include three principal sections: a primary reactor, a water gas shift converter, and a carbon monoxide cleanup system.

In the primary reactor, the preheated fuel/steam/air mixture comes in contact with the reforming catalysts, and the fuel is converted into products including hydrogen, carbon monoxide, carbon dioxide, and methane. Temperatures in this section typically range from 650-800° C. Various types of primary reactors can be used, such as steam reformers, autothermal reformers, and partial oxidation reformers.

High levels of carbon monoxide in the feed stream for the fuel cell can poison the anode electrodes of the fuel cell. As a result, the level of carbon monoxide in the process gas must be reduced before the process gas can be sent to the fuel cell. In the water gas shift converter, the products of the primary reactor are placed in contact with one or more water gas shift catalysts. The carbon monoxide reacts with water to produce hydrogen and carbon dioxide, reducing the concentration of carbon monoxide in the process gas. This reaction is known as the water gas shift reaction. Temperatures in the water gas shift converter are generally in the range of 200-600° C.

The final section of the fuel processing system is the carbon monoxide cleanup system. This section is designed to ensure that the hydrogen stream is of suitable quality for use in a proton exchange membrane (PEM) fuel cell (i.e., typically the carbon monoxide concentration is less than 50 ppm). This is usually described as a subsystem because several different types of catalytic, membrane and/or adsorption sections are combined as a unit, usually also including various heat exchangers.

Water gas shift converters are well known. They typically include a chamber with an inlet for the process gas from the primary reactor to enter and an outlet for the process gas to pass to the carbon monoxide cleanup system. There is a catalytic reaction zone between the inlet and the outlet. The catalytic reaction zone includes a catalyst for converting carbon monoxide to carbon dioxide by the water gas shift reaction according to the following equation:

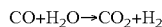

$$CO + H_2O \rightarrow CO_2 + H_2$$

This reaction not only reduces the carbon monoxide concentration, it also increases the carbon dioxide and hydrogen concentrations of the process gas.

Water gas shift catalysts are known. High temperature (400-450° C.) water gas shift catalysts include iron oxide, chromic oxide, and mixtures thereof. Other water gas shift catalysts include copper, zinc, iron, chromium, nickel, and cobalt compositions, as well as platinum, palladium, rhodium, gold, and ruthenium. Noble metals combined with cerium oxide have been used as water gas shift catalysts. However, they have a relatively low level of activity. U.S. Pat. No. 6,455,182 discloses a water gas shift catalyst which includes a noble metal on a support of mixed metal oxides, in which at least two of the oxides are cerium oxide and zirconium oxide. The cerium oxide and zirconium oxide are present in the range of about 50 to 30 mole % zirconium (42 to 23 wt %) to 50 to 70 mole % cerium (58 to 77 wt %). The patent limits the amount of zirconium to not less than 30 mole % (23 wt %) so that the zirconium provides enhanced stability to the catalyst, and not more than 50 mole % (42 wt %) to prevent phases which are only zirconium oxide and/or only cerium-oxide.

There remains a need for high activity water gas shift catalyst systems and for methods of using such catalyst systems.

SUMMARY OF THE INVENTION

This need is met by the present invention which provides high activity water gas shift catalyst systems and methods for using them.

The present invention provides a method of reducing the amount of carbon monoxide in process fuel gas in a water gas shift converter. The method includes placing one of the high activity water gas shift catalyst systems into a water gas shift converter, and passing the process fuel gas through the water gas shift converter in effective contact with the high activity water gas shift catalyst system and converting a portion of the carbon monoxide in the process fuel gas into carbon dioxide and hydrogen by the water gas shift reaction. The method may be performed at any suitable temperature. The best catalytic activity occurs at a temperature in the range of about 200° C. to about 400° C., with a temperature in the range of about 250° C. to about 375° C. being desirable.

The high activity water gas shift catalyst systems of the present invention include a noble metal and a support comprising a mixed metal oxide of cerium oxide, and zirconium oxide or lanthanum oxide. The catalyst system may include a promoter and/or a support dopant.

In one embodiment, the high activity water gas shift catalyst system includes a noble metal; a mixed metal oxide support consisting essentially of cerium oxide and zirconium oxide, wherein cerium oxide is present in an amount from about 58% to about 80% by weight of mixed metal oxide and zirconium oxide is present in amount from about 42% to about 20% by weight of mixed metal oxide; and a promoter comprising at least one metal selected from yttrium, alkali metals, or alkaline earth metals.

In another embodiment, the high activity water gas shift catalyst system includes a noble metal; and a mixed metal oxide support of cerium oxide and zirconium oxide, wherein cerium oxide is present in an amount from about 20% to less than 58% by weight of mixed metal oxide and zirconium oxide is present in amount from more than 42% to about 80% by weight of mixed metal oxide.

In still another embodiment, the high activity water gas shift catalyst system includes a noble metal; and a mixed metal oxide support consisting essentially of cerium oxide and lanthanum oxide, and optionally a support dopant. Generally, cerium oxide is present in an amount from about 92% to about 20% by weight of mixed metal oxide, and lanthanum oxide is present in amount from about 8% to about 80% by weight of mixed metal oxide.

Suitable noble metals include, but are not limited to platinum, palladium, mixtures of platinum and palladium, or mixtures of platinum and iridium. The noble metal is typically present in an amount of between about 1% to about 4% by weight of total catalyst.

Suitable promoters include, but are not limited to, yttrium, cesium, lithium, rubidium, potassium, magnesium, strontium, barium, calcium, or combinations thereof. The promoter is generally present in an amount of between about 0.1% and about 1% by weight of total catalyst.

The support may include a support dopant. The support dopant includes, but is not limited to, lanthanum, praseodymium, neodymium, or combinations thereof. It can be in the form of a metal oxide. The support dopant is generally present in an amount of between about 1 and about 5% by weight of mixed metal oxide.

DETAILED DESCRIPTION OF THE INVENTION

Figure 1:
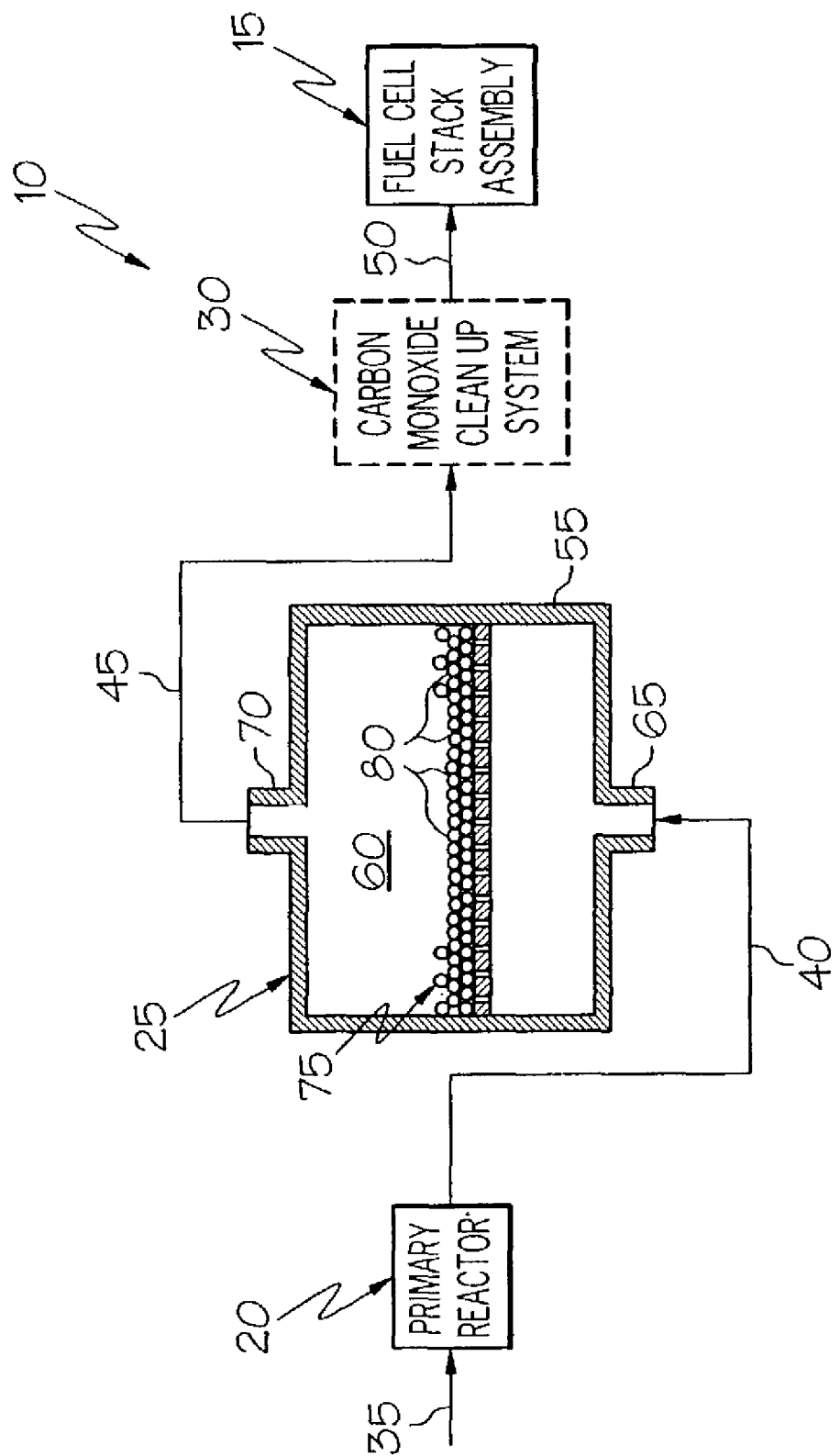
FIG. 1 is a schematic diagram of a fuel processing system for a fuel cell using a water gas shift catalyst system according to the present invention.

FIG. 1 shows a schematic diagram for a fuel processing system 10 for a fuel cell stack assembly 15. The fuel cell stack assembly 15 is of conventional design and construction. The fuel processing system 10 includes a primary reactor 20, a water gas shift converter 25, and a carbon monoxide cleanup system 30. The fuel processing system 10 converts a hydrocarbon fuel source into a hydrogen-rich stream which is supplied as fuel to the fuel cell stack assembly 15. The hydrocarbon fuel source is fed into the primary reactor 20 through inlet 35. Depending on the type of primary reactor used, air and/or steam are also provided. The hydrocarbon fuel and steam and/or air react in the presence of an appropriate catalyst to produce hydrogen, carbon monoxide, carbon dioxide, and residual water in the primary reactor 20.

After exiting from the primary reactor 20, the process gas flows through channel 40 to the water gas shift converter 25. The water gas shift reaction shown above takes place in the water gas shift converter 25. The process gas then flows through channel 45 to the carbon monoxide cleanup system 30, if necessary. The optional carbon monoxide cleanup system 30 further reduces the amount of carbon monoxide in the process gas stream. The process gas stream, which is hydrogen-rich and has an acceptably low concentration of carbon monoxide, then flows through channel 50 to the fuel cell stack assembly 15.

The water gas shift converter 25 includes a housing 55 which defines a catalyst chamber 60. The catalyst chamber 60 has an inlet 65 and an outlet 70. The process gas enters catalyst chamber 60 through inlet 65 from the primary reactor 20 and channel 40. The process gas exits the catalyst chamber 60 through outlet 70, and then flows through channel 45 to the carbon monoxide cleanup system 30. The catalyst chamber 60 includes one or more catalyst beds 75. The process gas from the primary reactor enters through inlet 65 and flows through the catalyst bed 75. The catalyst bed 75 includes the water gas shift catalyst system 80 of the present invention. Although the water gas shift catalyst system is shown as a bed, it will be understood by those of skill in the art that the catalyst could be supported by other arrangements, as are well known in the art. For example, honeycomb structures made of ceramic, alumina, cordierite, or the like could also be used.

The water gas shift catalyst system of the present invention includes a noble metal. Suitable noble metals include, but are not limited to; platinum, palladium, mixtures of platinum and palladium, and mixtures of platinum and iridium. The noble metal is dispersed on or in the lattice of the support. The noble metal can be present in an amount of between about 1% to about 4% by weight of total catalyst.

The catalyst system also includes a mixed metal oxide support of cerium oxide, and zirconium oxide or lanthanum oxide. In the cerium oxide-zirconium oxide supports, the cerium oxide can be present in an amount ranging from about 20% to about 80% by weight of mixed metal oxide, while the zirconium oxide can be present in an amount ranging from about 80% to about 20% by weight of mixed metal oxide. In the cerium oxide-lanthanum oxide supports, the cerium oxide can be present in an amount ranging from about 20% to about 92% by weight of mixed metal oxide, while lanthanum oxide can be present in an amount ranging from about 80% to about 8% by weight of mixed metal oxide.

The catalyst system can include a promoter, if desired. The promoter can be one or more of yttrium, alkali metals, or alkaline earth metals. Suitable promoters include, but are not limited to, yttrium, cesium, lithium, rubidium, potassium, magnesium, strontium, barinum, calcium, or combinations thereof. The promoter can be present in an amount ranging from about 0.1% to about 1% by weight of total catalyst.

The catalyst system can also include a support dopant, if desired. Suitable support dopants include, but are not limited to lanthanum, praseodymium, neodymium, or combinations thereof. The support dopant can be present in an amount of between about 1 and about 5% by weight of the mixed metal oxide. The support dopant can be in form of a metal oxide.

Catalysts according to the present invention were made and tested for catalyst activity and methane formation.

Some catalysts were made by the incipient wetness method. First, the adsorption factor was determined for each oxide support. The platinum group metal (PGM) or promoter solution volume necessary to get the catalyst completely, "soaked" was determined from the adsorption factor (the pre-determined adsorption volume plus ten percent excess water to allow thorough mixing). The precursor of the PGM component to be deposited on the oxide support was in the form of concentrated PGM solution. This solution was subsequently diluted with deionized water, to reach the predetermined volume necessary to perform the incipient wetness, and added slowly to the powder oxide support under continuous mixing, at room temperature. The mixture was dried for between about 2-5 hours at 125° C. in an oven, either with air circulation or without it. During the drying process, the wet powder was taken out periodically and re-mixed. The dried mixture was then calcined in a furnace at 500° C. for about 2 hours without air circulation.

For formulations containing more than one deposited component (two PGM or one PGM and one promoter), the incipient wetness method was performed either sequentially (sequential impregnation or sequential incipient wetness) or simultaneously (co-impregnation or co-incipient wetness). This is shown by the way the formulations are written. A/B/ oxide means sequential impregnation: B impregnated onto the oxide followed by drying and calcination, then A impregnated onto the oxide followed by drying and calcinations. (A-B)/oxide means co-impregnation of A and B on the oxide.

Another method used was coprecipitation of the PGM precursor together with the mixed oxide precursors. For example, Pt, Ce, and Zr salt solutions were premixed together and co-precipitated by adding the solution mixture to sodium hydroxide solution, followed by filtration, washing to a neutral pH, and drying and calcining as described above. Combined sequential and co-precipitation methods were also applied, for example by first completely precipitating the Ce precursor, followed by the co-precipitation of Pt—Zr solutions, in the same reactor.

The water gas shift catalyst systems were tested using a fixed bed reactor, with 1 g catalyst, and 1 g cordierite both sized at 45-60 mesh. The tests were performed at 67,500 cc/g cat/hr weight hourly space velocity, using a process gas stream containing 8% carbon monoxide, 30% water, 10% carbon dioxide, 32.5% hydrogen, 1% methane, with the balance being nitrogen. During the test, the temperature was increased from about 150° C. to about 450° C. or to about 600° C. and held constant at chosen intermediate temperatures such that steady state temperatures and steady state conversions were obtained at these temperatures within the range studied.

Figure 2:
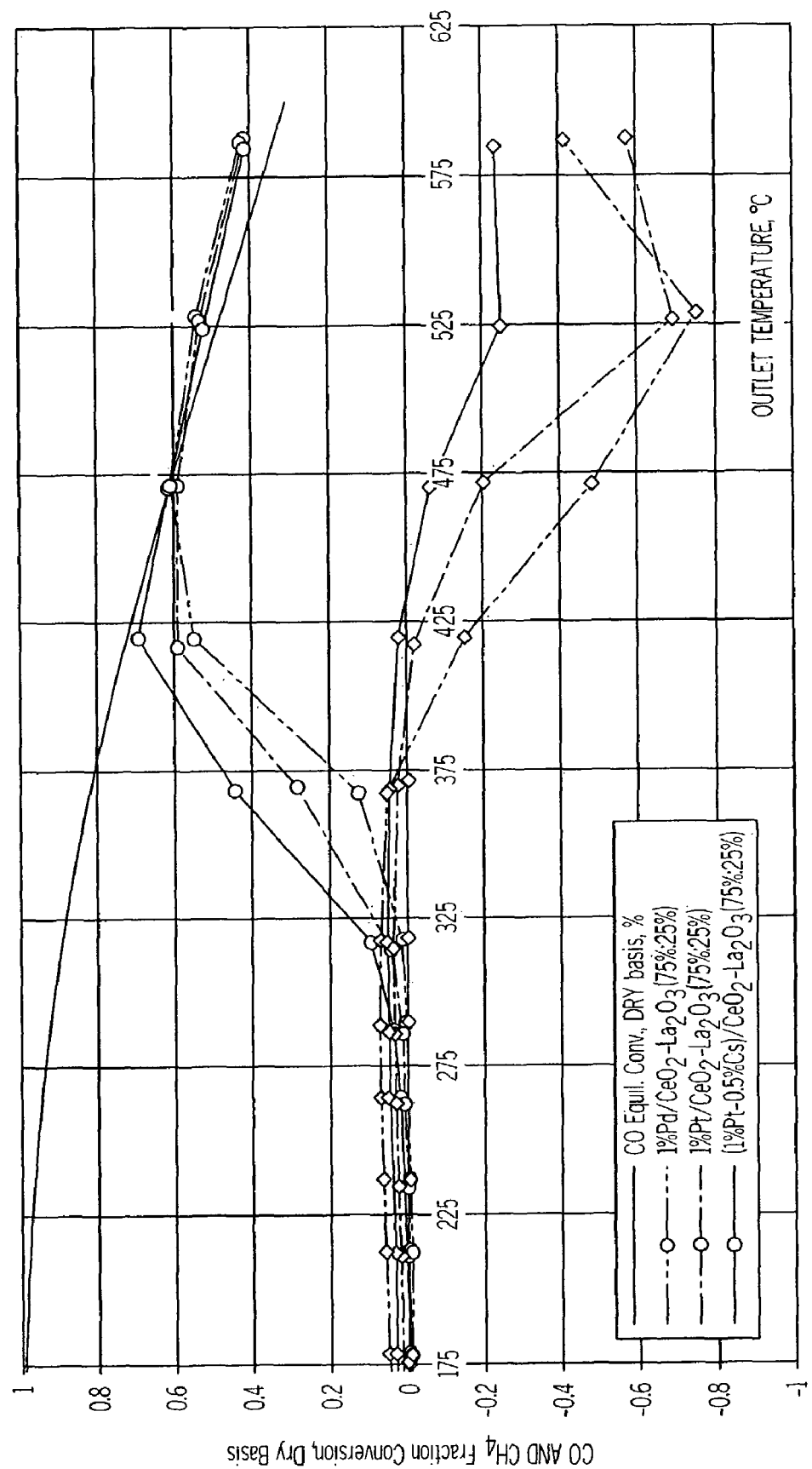
FIG. 2 is a graph showing catalyst activity and methane formation for some cerium oxide/lanthanum oxide mixed oxide catalysts of the present invention, in comparison with 1% $Pt/CeO_2$.
Figure 3:
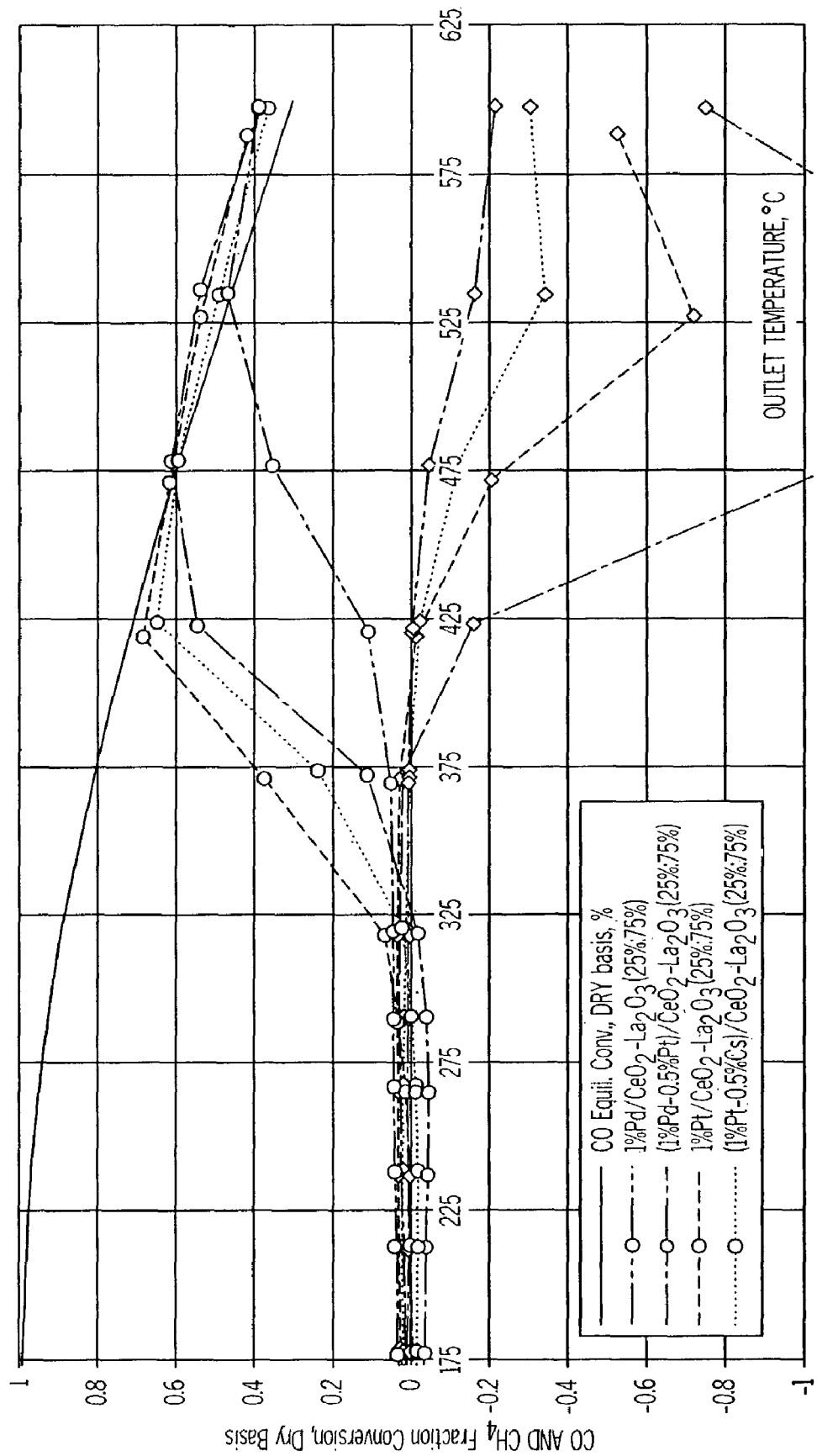
FIG. 3 is a graph showing catalyst activity and methane formation for some cerium oxide/lanthanum oxide mixed oxide catalysts of the present invention, in comparison with 1% $Pt/CeO_2$.

The results of the testing are shown in FIGS. 2-7. FIGS. 2 and 3 compare the effects of different ratios of cerium oxide/lanthanum oxide mixed oxides (75:25 in FIG. 2 and 25:75 in FIG. 3). FIGS. 2 and 3 also show the effect of the use of various noble metals, as well as the use of Cs as an alkaline metal promoter.

Figure 4:
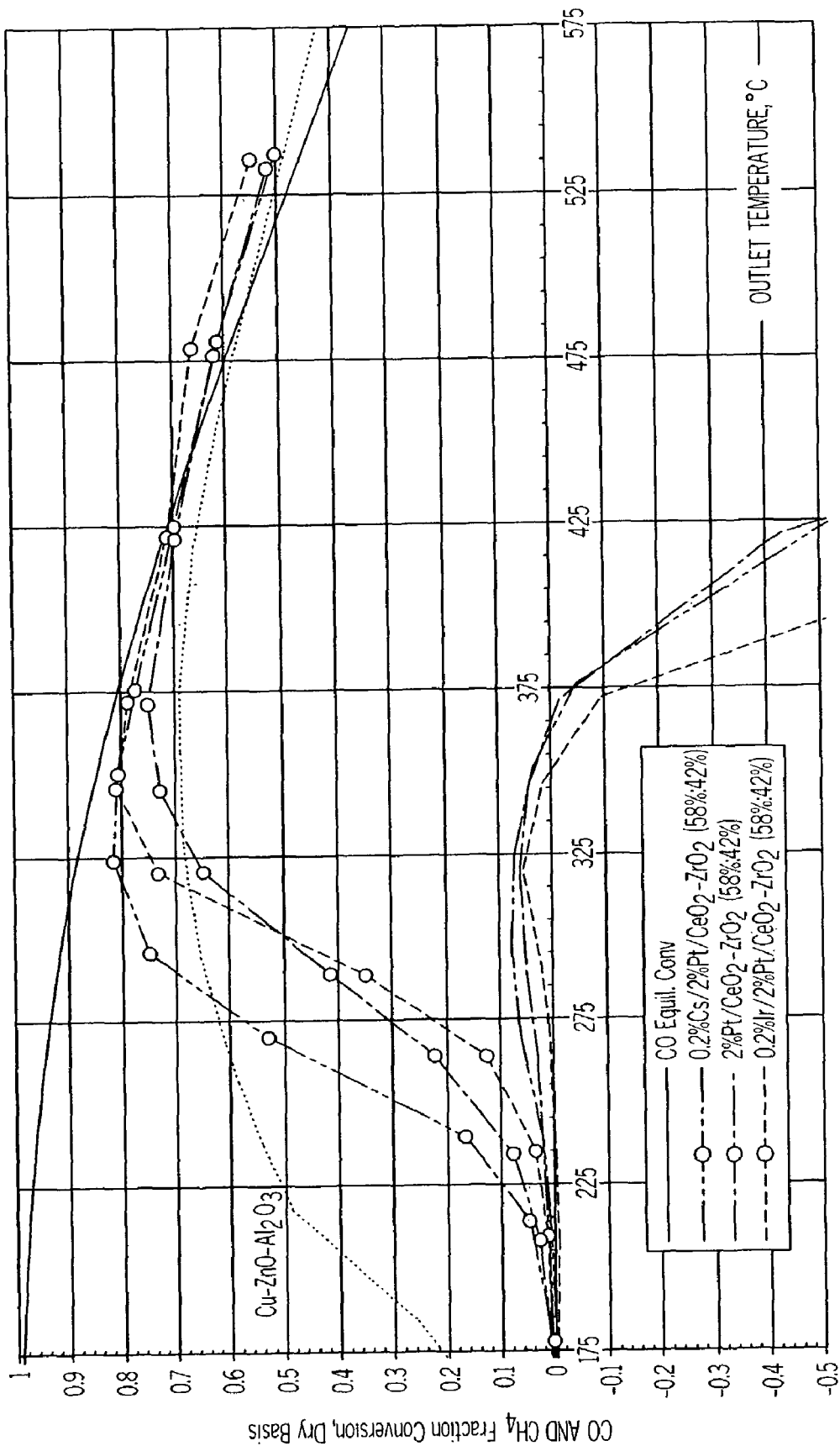
FIG. 4 is a graph showing catalyst activity and methane formation for some stoichiometric cerium oxide/zirconium oxide mixed oxide catalysts of the present invention.

FIG. 4 shows the effect of the use of different noble metals and Cs as an alkaline earth metal promoter on stoichiometric cerium oxide/zirconium oxide ($CeO_2$—$ZrO_2$ 58:42, wt %).

Figure 5:
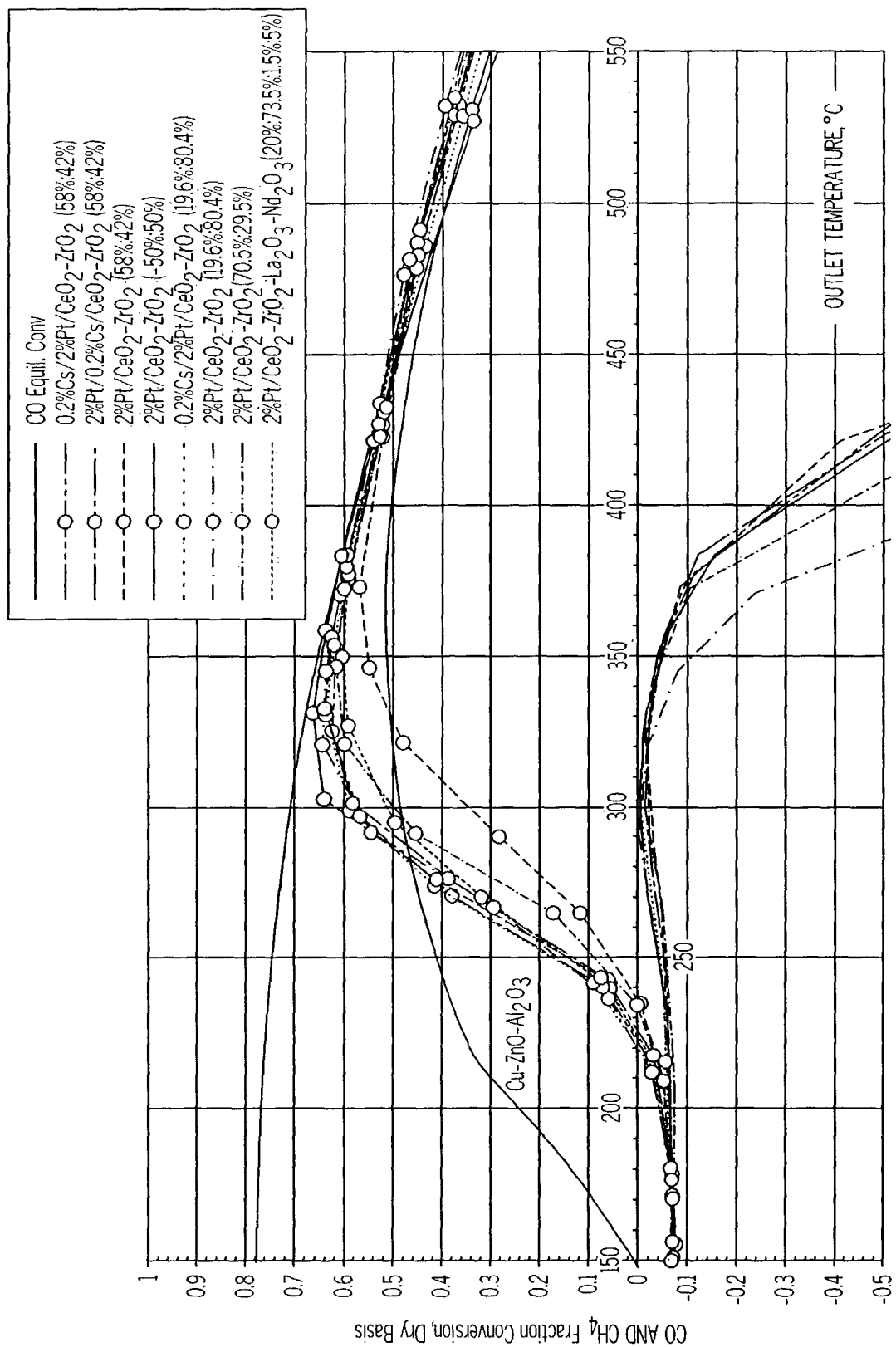
FIG. 5 is a graph showing catalyst activity and methane formation for cerium oxide/zirconium oxide mixed oxide catalysts of the present invention.

FIG. 5 shows the effect on cerium oxide/zirconium oxide mixed oxides of different ratios of cerium oxide to zirconium oxide, as well as the effect of Cs as an alkaline metal promoter, and support dopants.

Figure 6:
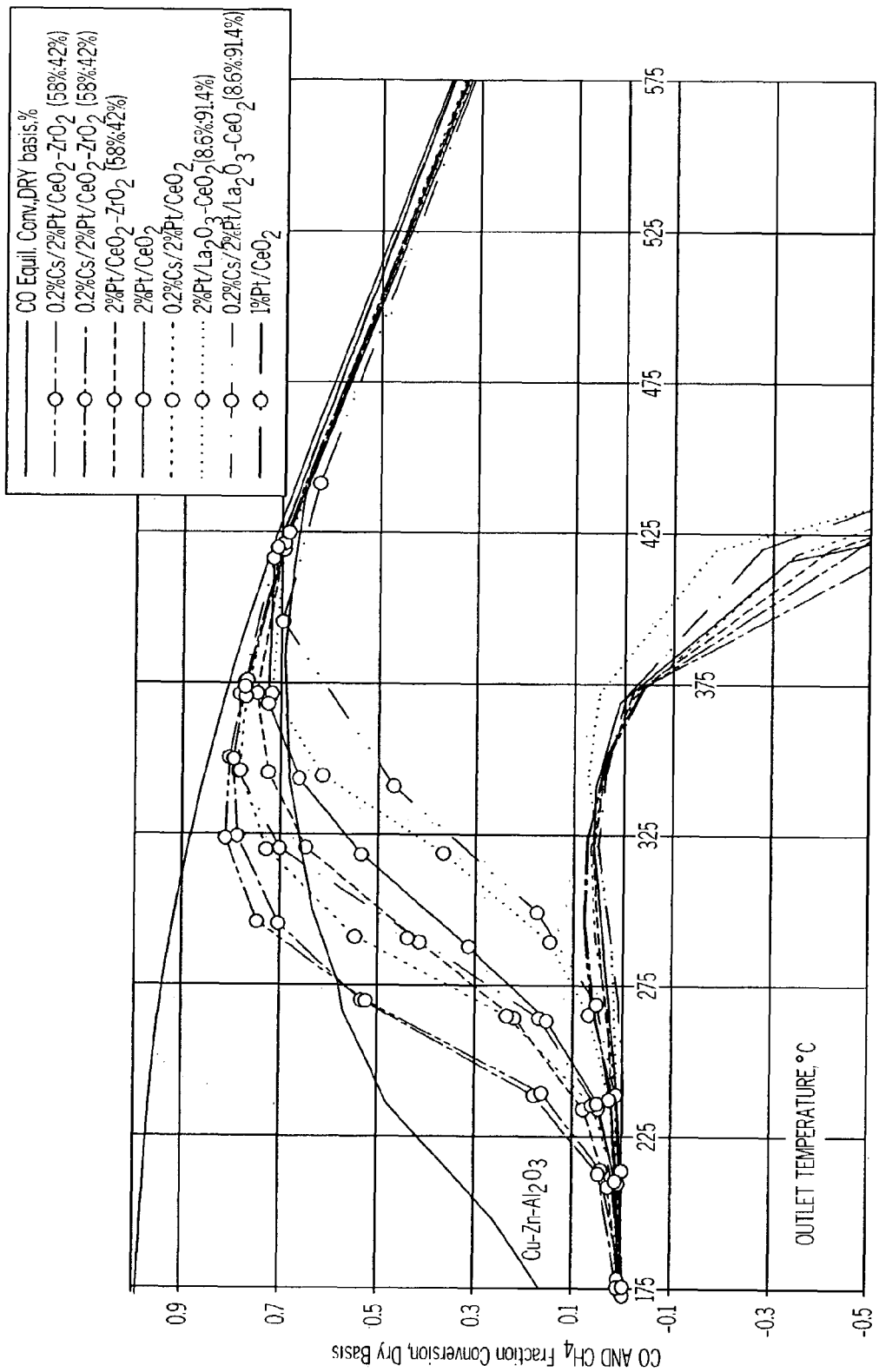
FIG. 6 is a graph showing catalyst activity and methane formation for various mixed oxide catalysts of the present invention in comparison with the activity of the same noble metal or promoted formulation on $CeO_2$.

FIG. 6 shows the effect on the water-gas shift conversion of the various mixed oxides catalysts of the present invention, as well as the amount of noble metal.

Figure 7:
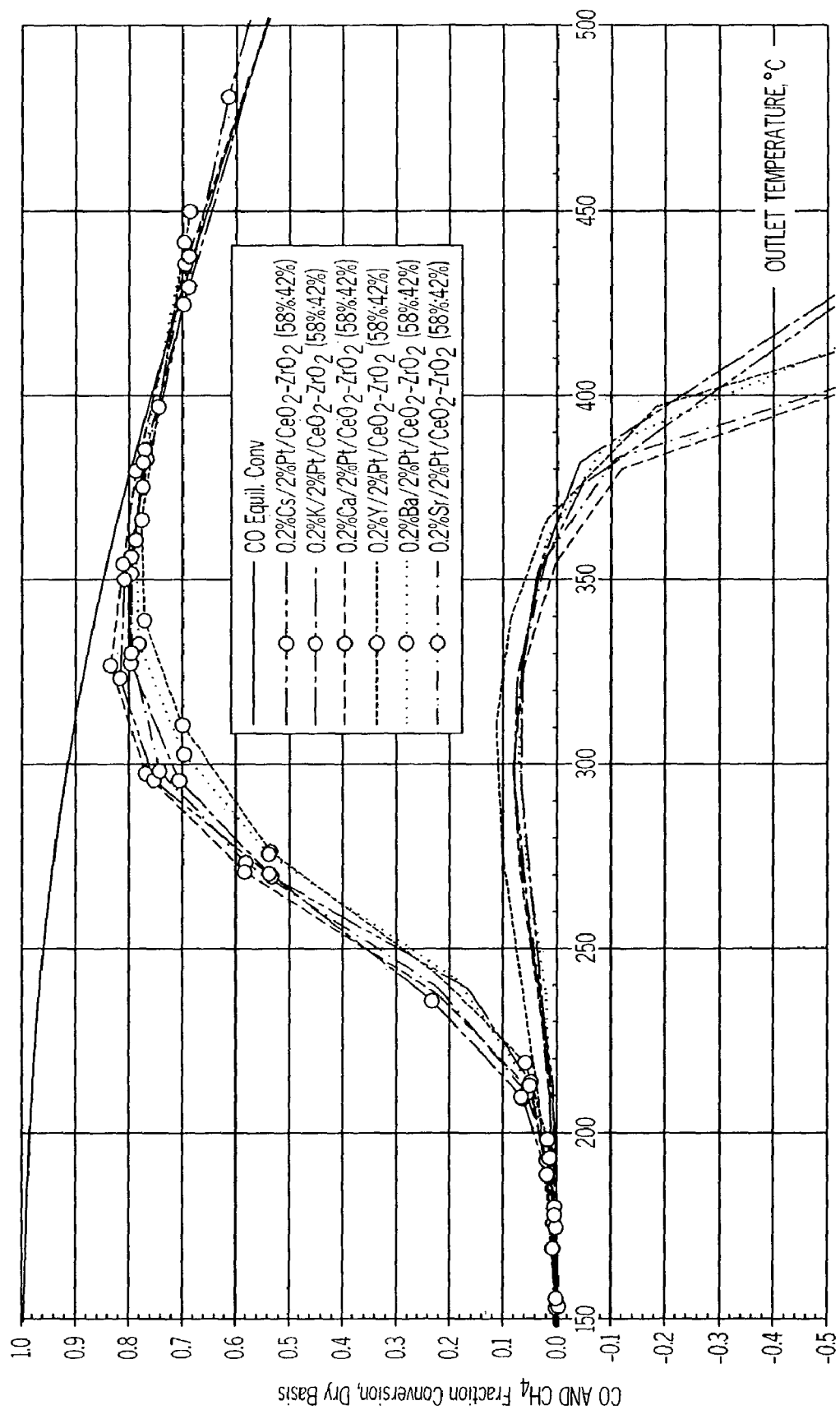
FIG. 7 is a graph showing catalyst activity and methane formation for some stoichiometric cerium oxide/zirconium oxide mixed oxide catalysts of the present invention.

FIG. 7 shows the effect of various alkali metal, alkaline earth metal, or other promoters on 2% Pt/stoichiometric cerium oxide-zirconium oxide.

Water gas shift catalyst systems using the cerium oxide/zirconium oxide mixed oxides showed improved catalytic performance over those using cerium oxide/lanthanum oxide mixed oxides, as well as over either cerium oxide alone or zirconium oxide alone. The cerium oxide/zirconium oxide formulations showed a decrease in the onset temperature of the water gas shift reaction (light off temperature) compared to cerium oxide/lanthanum oxide, cerium oxide alone, and zirconium oxide alone. Although the reasons for the improved catalytic activity by the catalyst systems using cerium oxide/zirconium oxide mixed oxides are not clear and although not wishing to be bound by theory, there are several possible explanations. A possible explanation is that the cerium oxide/zirconium oxide mixed oxide provides improved water adsorption properties compared to cerium oxide alone, while maintaining the oxygen mobility of the cerium oxide. Another possible explanation is that there is a higher metal dispersion on cerium oxide/zirconium oxide mixed oxides than on cerium oxide when the same method of metal deposition is used. In addition, the cerium oxide/zirconium oxide mixed oxide may provide high thermal stability and, therefore, improved durability and long-term stability of the mixed oxide phase.

The optimum cerium oxide/zirconium oxide ratio is about 20:80 to about 58:42. The advantage of about 42 to about 80 wt % zirconium oxide may be due to improved water adsorption properties, and it may result in improved durability. Cerium oxide should be included in the catalyst formulations because platinum/zirconium oxide has poorer performance.

Platinum combined with cerium oxide/zirconium oxide mixed oxides has better catalytic activity than palladium, mixtures of platinum and palladium, or mixtures of platinum and iridium combined with the same oxides and prepared in the same manner. Platinum formulations have advantages over palladium formulations based on the temperature difference between the onset of the water gas shift reaction and the onset of methanation. The no-methanation window for the water gas shift reaction is wider for platinum formulations than it is for palladium formulations on the Ce—Zr oxides of the present application.

Methane formation is seen to a small extent at temperatures over 350°-375° C. under the test conditions of this application. The presence of alkali and alkaline earth metal promoters reduces the extent of methanation (conversion to methane formation) and/or enlarges the no-methanation window (the temperature difference between the onset of the water-gas shift reaction and the onset of methanation), usually by shifting the water-gas shift light-off temperature to lower temperatures, and more so for formulations containing ceria-zirconia oxides. When lithium is used as the promoter, the temperature corresponding to the onset of methanation is slightly higher than when cesium is used.

Although the reasons are not clear and although not wishing to be bound by theory, the promoters are believed to improve the water adsorption/chemisorption properties of the oxidic support. There is a more pronounced increase in the catalytic activity of formulations incorporating promoters for the cerium-rich mixed oxides than for zirconium-rich mixed oxides or for lanthanum-rich mixed oxides.

Cesium and lithium promoters of Pt/cerium oxide-zirconium oxide catalyst formulations provide improvement in the water gas shift activity, and at lower temperatures compared to the unpromoted catalyst formulations.

Figure 8:
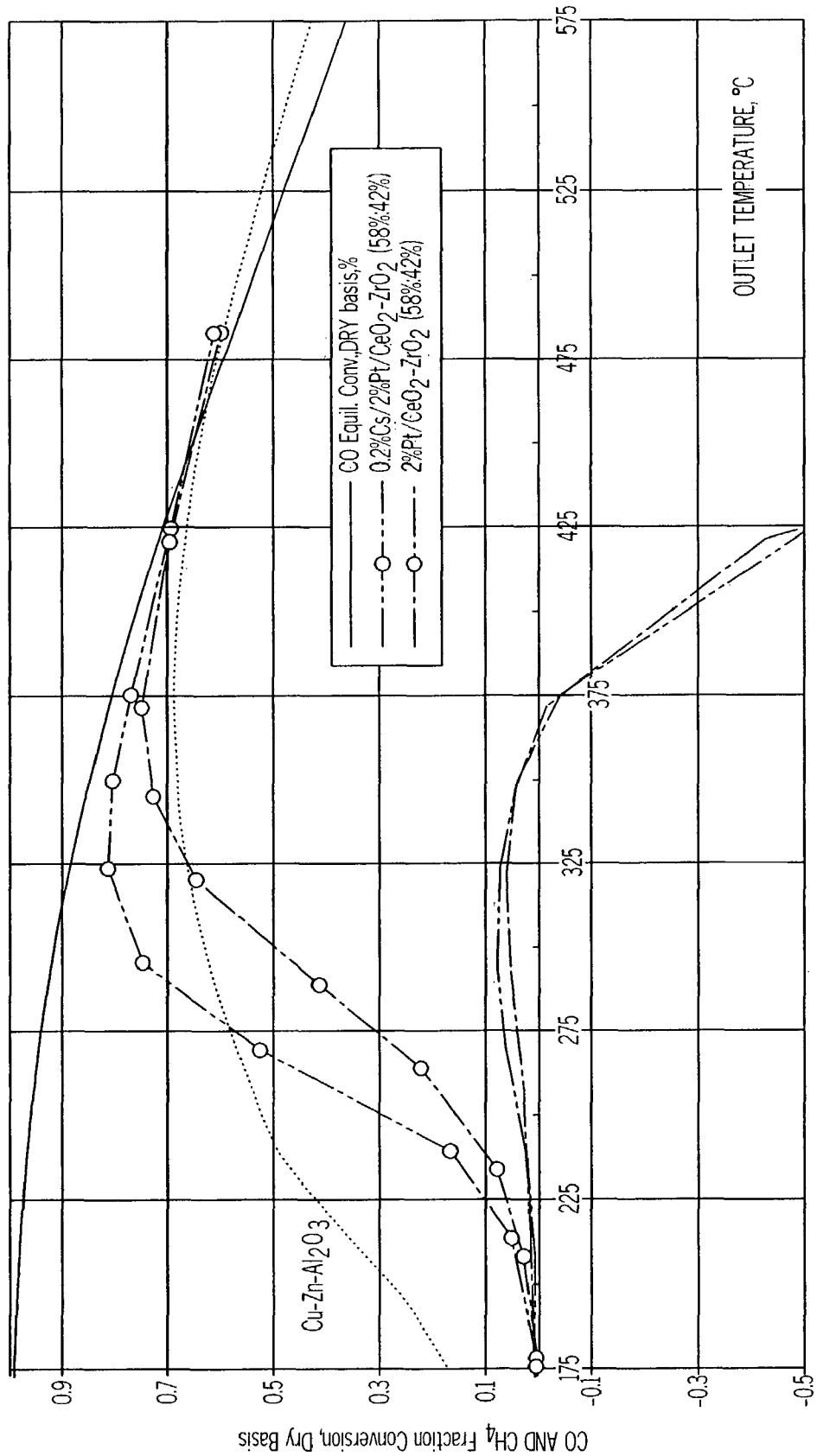
FIG. 8 is a graph showing the effect of a cesium promoter in lowering the temperature of the onset of the water gas shift reaction for a stoichiometric cerium oxide/zirconium oxide mixed oxide catalyst of the present invention.

The presence of a cesium or lithium promoter in a formulation of 2% Pt/$CeO_2$—$ZrO_2$ (58:42 wt %) or in 2% Pt/$CeO_2$ results in a decrease of between about 20-50° C. in the temperature corresponding to a CO conversion between about 30% and 75% (CO Conversion, DRY), respectively, as compared to the unpromoted formulation of Pt/$CeO_2$—$ZrO_2$ (58:42 wt %) or 2% Pt/$CeO_2$, as shown in FIG. 8. The decrease in the temperature of maximum catalytic activity is advantageous because it provides a wider no-methanation window.

The support dopants may improve the thermal stability of the support. However, the use of support dopants resulted in a reduction of catalyst activity in some instances.

While the invention has been described by reference to certain embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method of reducing an amount of carbon monoxide in a feed stream for a fuel cell, comprising:
   introducing a hydrocarbon feed stream into a primary reactor and reacting the hydrocarbon feed stream in effective contact with a reforming catalyst forming primary reactor products containing hydrogen, carbon monoxide, carbon dioxide, and methane;
   placing a high activity water gas shift catalyst system into a water gas shift converter, the high activity water gas shift catalyst system comprising a noble metal; a mixed metal oxide support consisting essentially of cerium oxide and zirconium oxide, wherein cerium oxide is present in an amount from about 58% to about 80% by weight of mixed metal oxide and zirconium oxide is present in amount from about 42% to about 20% by weight of mixed metal oxide, and optionally a support dopant; and about 0.1% to about 1.0% by weight of total catalyst of a promoter comprising alkali metals, or alkaline earth metals, or combinations thereof; and
   introducing the primary reactor products into the water gas shift converter in effective contact with the high activity water gas shift catalyst system, and reacting the carbon monoxide and water to form carbon dioxide and hydrogen using a water gas shift reaction forming the feed stream for the fuel cell; and
   introducing the feed stream into the fuel cell;
   wherein the high activity water gas shift catalyst system converts at least 50% of the carbon monoxide in the primary reactor products into carbon dioxide and hydrogen by the water gas shift reaction over a temperature range from about 300° C. to about 450° C.

2. The method of claim 1 wherein the noble metal is selected from platinum, palladium, mixtures of platinum and palladium, or mixtures of platinum and iridium.

3. The method of claim 1 wherein the noble metal is present in an amount of between about 1% to about 4% by weight of total catalyst.

4. The method of claim 1 wherein the promoter is selected from cesium, lithium, rubidium, potassium, magnesium, strontium, barium, calcium, or combinations thereof.

5. The method of claim 1 wherein the support dopant is selected from lanthanum, praseodymium, neodymium, or combinations thereof.

6. The method of claim 1 wherein the support dopant is in the form of a metal oxide.

7. The method of claim 1 wherein the support dopant is present in an amount of between about 1 and about 5% by weight of mixed metal oxide.

8. The method of claim 1 wherein passing the process fuel gas through the water gas shift converter is performed at a temperature in the range of about 200° C. to about 400° C.

9. The method of claim 1 wherein passing the process fuel gas through the water gas shift converter is performed at a temperature in the range of about 250° C. to about 375° C.

10. A method of reducing an amount of carbon monoxide in a feed stream for a fuel cell, comprising:
    introducing a hydrocarbon feed stream into a primary reactor and reacting the hydrocarbon feed stream in effective contact with a reforming catalyst forming primary reactor products containing hydrogen, carbon monoxide, carbon dioxide, and methane;
    placing a high activity water gas shift catalyst system into a water gas shift converter, the high activity water gas shift catalyst system comprising a noble metal; a mixed metal oxide support of cerium oxide and zirconium oxide, wherein cerium oxide is present in an amount from about 20% to less than 58% by weight of mixed metal oxide and zirconium oxide is present in amount from more than 42% to about 80% by weight of mixed metal oxide; and about 0.1% to about 1.0% by weight of total catalyst of a promoter comprising at least one metal selected from alkali metals, or alkaline earth metals; and
    introducing the primary reactor products into the water gas shift converter in effective contact with the high activity water gas shift catalyst system, and reacting the carbon monoxide and water to form carbon dioxide and hydrogen using a water gas shift reaction forming the feed stream for the fuel cell; and
    introducing the feed stream into the fuel cell;
    wherein the high activity water gas shift catalyst system converts at least 50% of the carbon monoxide in the primary reactor products into carbon dioxide and hydrogen by the water gas shift reaction over a temperature range from about 300° C. to about 450° C.

11. The method of claim 10 wherein the noble metal is selected from platinum, palladium, mixtures of platinum and palladium, or mixtures of platinum and iridium.

12. The method of claim 10 wherein the noble metal is present in an amount of between about 1% to about 4% by weight of total catalyst.

13. The method of claim 10 wherein the promoter is selected from cesium, lithium, rubidium, potassium, magnesium, strontium, barium, calcium, or combinations thereof.

14. The method of claim 10 wherein the mixed metal oxide support further comprises a support dopant.

15. The method of claim 14 wherein the support dopant is selected from lanthanum, praseodymium, neodymium, or combinations thereof.

16. The method of claim 14 wherein the support dopant is in the form of a metal oxide.

17. The method of claim 14 wherein the support dopant is present in an amount of between about 1 and about 5% by weight of mixed metal oxide.

18. The method of claim 10 wherein passing the process fuel gas through the water gas shift converter is performed at a temperature in the range of about 200° C. to about 400° C.

19. The method of claim 10 wherein passing the process fuel gas through the water gas shift converter is performed at a temperature in the range of about 250° C. to about 375° C.

20. A method of reducing an amount of carbon monoxide in a feed stream for a fuel cell, comprising:
    introducing a hydrocarbon feed stream into a primary reactor and reacting the hydrocarbon feed stream in effective contact with a reforming catalyst forming primary reactor products containing hydrogen, carbon monoxide, carbon dioxide, and methane;
    placing a high activity water gas shift catalyst system into a water gas shift converter, the high activity water gas shift catalyst system comprising a noble metal; a mixed metal oxide support consisting essentially of cerium oxide and lanthanum oxide, and optionally a support dopant; and about 0.1% to about 1.0% by weight of total catalyst of a promoter comprising at least one metal selected from alkali metals, or alkaline earth metals; and introducing the primary reactor products into the water gas shift converter in effective contact with the high activity water gas shift catalyst system, and reacting the carbon monoxide and water to form carbon dioxide and hydrogen using a water gas shift reaction forming the feed stream for the fuel cell; and introducing the feed stream into the fuel cell;

wherein the high activity water gas shift catalyst system converts at least 40% of the carbon monoxide primary reactor products into carbon dioxide and hydrogen by the water gas shift reaction over a temperature range from about 400° C. to about 575° C.

21. The method of claim 20 wherein the noble metal is selected from platinum, palladium, mixtures of platinum and palladium, or mixtures of platinum and iridium.

22. The method of claim 20 wherein the noble metal is present in an amount of between about 1% to about 4% by weight of total catalyst.

23. The method of claim 20 wherein cerium oxide is present in an amount from about 92% to about 20% by weight of mixed metal oxide and lanthanum oxide is present in amount from about 8% to about 80% by weight of mixed metal oxide.

24. The method of claim 20 wherein the promoter is selected from cesium, lithium, rubidium, potassium, magnesium, strontium, barium, calcium, or combinations thereof.

25. The method of claim 20 wherein the support dopant is selected from praseodymium, neodymium, or combinations thereof.

26. The method of claim 20 wherein the support dopant is in the form of a metal oxide.

27. The method of claim 25 wherein the support dopant is present in an amount of between about 1 and about 5% by weight of mixed metal oxide.

28. The method of claim 20 wherein passing the process fuel gas through the water gas shift converter is performed at a temperature in the range of about 200° C. to about 425° C.

29. The method of claim 20 wherein passing the process fuel gas through the water gas shift converter is performed at a temperature in the range of about 275° C. to about 400° C.

30. A high activity water gas shift catalyst system for a fuel cell, in which there is a primary reactor with a reforming catalyst followed by a water gas shift converter with the high activity water gas shift catalyst system to provide a feed stream for the fuel cell, the high activity water gas shift catalyst system comprising:

a noble metal;

a mixed metal oxide support consisting essentially of cerium oxide and zirconium oxide, wherein the cerium oxide is present in an amount from about 58% to about 80% by weight of mixed metal oxide and the zirconium oxide is present in amount from about 42% to about 20% by weight of mixed metal oxide, and optionally a support dopant; and about 0.1% to about 0.2% by weight of total catalyst of a promoter comprising alkali metals, or alkaline earth metals, or combinations thereof the high activity water gas shift catalyst system having a conversion rate of at least 50% for reacting carbon monoxide and water into carbon dioxide and hydrogen in a water gas shift reaction over a temperature range of from about 300° C. to about 450° C.

31. The high activity water gas shift catalyst system of claim 30 wherein the noble metal is selected from platinum, palladium, mixtures of platinum and palladium, or mixtures of platinum and iridium.

32. The high activity water gas shift catalyst system of claim 30 wherein the noble metal is present in an amount of between about 1% to about 4% by weight of total catalyst.

33. The high activity water gas shift catalyst system of claim 30 wherein the support dopant is selected from lanthanum, praseodymium, neodymium, or combinations thereof.

34. The high activity water gas shift catalyst system of claim 30 wherein the support dopant is present in an amount of between about 1 and about 5% by weight of mixed metal oxide.

35. The high activity water gas shift catalyst system of claim 30 wherein the promoter is selected from cesium, lithium, rubidium, potassium, magnesium, strontium, barium, calcium, or combinations thereof.

36. A high activity water gas shift catalyst system for a fuel cell, in which there is a primary reactor with a reforming catalyst followed by a water gas shift converter with the high activity water gas shift catalyst system to provide a feed stream for the fuel cell, the high activity water gas shift catalyst system comprising:

a noble metal; and a mixed metal oxide support consisting essentially of cerium oxide and zirconium oxide, wherein cerium oxide is present in an amount from about 20% to less than 58% by weight of mixed metal oxide and zirconium oxide is present in amount from more than 42% to about 80% by weight of mixed metal oxide, and optionally a support dopant;

about 0.1% to about 0.2% by weight of total catalyst of a promoter comprising at least one metal selected from alkali metals, and alkaline earth metals, the high activity water gas shift catalyst system having a conversion rate of at least 50% for reacting carbon monoxide and water into carbon dioxide and hydrogen in a water gas shift reaction over a temperature range of from about 300° C. to about 450° C.

37. The high activity water gas shift catalyst system of claim 36 wherein the noble metal is selected from platinum, palladium, mixtures of platinum and palladium, or mixtures of platinum and iridium.

38. The high activity water gas shift catalyst system of claim 36 wherein the noble metal is present in an amount of between about 1% to about 4% by weight of total catalyst.

39. The high activity water gas shift catalyst system of claim 36 wherein the support dopant is selected from lanthanum, praseodymium, neodymium, or combinations thereof.

40. The high activity water gas shift catalyst system of claim 36 wherein the support dopant is present in an amount of between about 1 and about 5% by weight of mixed metal oxide.

41. The high activity water gas shift catalyst system of claim 36 wherein the promoter is selected from cesium, lithium, rubidium, potassium, magnesium, strontium, barium, calcium, or combinations thereof.

42. A high activity water gas shift catalyst system for a fuel cell, in which there is a primary reactor with a reforming catalyst followed by a water gas shift converter with the high activity water gas shift catalyst system to provide a feed stream for a fuel cell, the high activity water gas shift catalyst system comprising:

a noble metal;

a mixed metal oxide support consisting essentially of cerium oxide and lanthanum oxide, wherein cerium oxide is present in an amount from about 20% to less than 92% by weight of mixed metal oxide and lanthanum oxide is present in amount from about 80% to more than 8% by weight of mixed metal oxide, and optionally a support dopant; and about 0.1% to about 0.5% by weight of total catalyst of a promoter comprising at least one metal selected from alkali metals, and alkaline earth metals, the high activity water gas shift catalyst system having a conversion rate of at least 40% for carbon monoxide to carbon dioxide and hydrogen in a water gas shift reaction over a temperature range from about 400° C. to about 575° C.

43. The high activity water gas shift catalyst system of claim 42 wherein the noble metal is selected from platinum, palladium, mixtures of platinum and palladium, or mixtures of platinum and iridium.

44. The high activity water gas shift catalyst system of claim 42 wherein the noble metal is present in an amount of between about 1% to about 4% by weight of total catalyst.

45. The high activity water gas shift catalyst system of claim 42 wherein the support dopant is selected from praseodymium, neodymium, or combinations thereof.

46. The high activity water gas shift catalyst system of claim 42 wherein the support dopant is present in an amount of between about 1 and about 5% by weight of mixed metal oxide.

47. The high activity water gas shift catalyst system of claim 42 wherein the promoter is selected from cesium, lithium, rubidium, potassium, magnesium, strontium, barium, calcium, or combinations thereof.

48. The method of claim 1 wherein the promoter is present in an amount of about 0.1% to about 0.2%.

49. The method of claim 10 wherein the promoter is present in an amount of about 0.1% to about 0.2%.

50. The method of claim 20 wherein the promoter is present in an amount of about 0.1% to about 0.5%.

* * * * *